(12) United States Patent
Toyoda et al.

(10) Patent No.: US 6,565,249 B2
(45) Date of Patent: May 20, 2003

(54) SPREAD ILLUMINATING APPARATUS INCLUDING FRAME WITH TWO SECTIONS STEPPED

(75) Inventors: Koichi Toyoda, Iwata-gun (JP); Takashi Ishii, Iwata-gun (JP)

(73) Assignee: Minebea Co., Ltd., Kitasaku-gun (JP)

( * ) Notice: Subject to any disclaimer, the term of this patent is extended or adjusted under 35 U.S.C. 154(b) by 0 days.

(21) Appl. No.: 10/026,876

(22) Filed: Dec. 27, 2001

(65) Prior Publication Data

US 2002/0080600 A1 Jun. 27, 2002

(30) Foreign Application Priority Data

Dec. 27, 2000 (JP) ........................................ 2000-398525

(51) Int. Cl.[7] .............................................. G09F 13/00
(52) U.S. Cl. ............................ 362/560; 362/31; 362/26; 362/330; 385/901
(58) Field of Search ............................ 362/560, 31, 26, 362/330, 331, 551, 555; 385/901; 349/62, 65

(56) References Cited

U.S. PATENT DOCUMENTS 6,390,639 B2 * 5/2002 Suzuki et al. ................. 362/31
6,431,716 B1 * 8/2002 Kusakabe ..................... 362/31
6,467,925 B2 * 10/2002 Egawa et al. ................. 362/31
6,494,588 B1 * 12/2002 Okada .......................... 362/31

* cited by examiner

Primary Examiner—Sandra O'Shea
Assistant Examiner—Ali Alavi
(74) Attorney, Agent, or Firm—Oliff & Berridge, PLC

(57) ABSTRACT

There is provided a spread illuminating apparatus to improve a light coupling efficiency between a light conductive member and a transparent substrate. In the spread illuminating apparatus, an FPC mounting section of a frame is set to be lower than a substrate mounting section by the thickness of an FPC, and an extension provided at an FPC main body is let through an opening formed at a stepped part of the frame so as to be disposed on a reverse side of the frame, whereby an upper surface of the light conductive member is adapted to be flush with an upper surface of the transparent substrate while prevention of the deviation in the thickness direction between the light conductive member and the transparent substrate is not obstructed even when the extension is provided, which results in improving the light coupling efficiency.

4 Claims, 4 Drawing Sheets ns of the spread illuminating apparatus 1A according to a first
embodiment of the present invention is hereinafter explained# SPREAD ILLUMINATING APPARATUS INCLUDING FRAME WITH TWO SECTIONS STEPPED

BACKGROUND OF THE INVENTION

1. Field of the Invention

The present invention relates to a spread illuminating apparatus, and more particularly to a spread illuminating apparatus used as an illuminating means for a liquid crystal display device.

2. Description of the Related Art

A demand for a liquid crystal display device operating in a low power consumption is increasing mainly for a computer-related field due to its low profile and light weight. However, since a liquid crystal of the liquid crystal display device does not emit light by itself unlike a light emitting element such as a cathode-ray tube, a separate illuminating means is required for an image observation. In particular, a spread illuminating apparatus of side light type (light conductive plate type) is used as an illuminating means for the liquid crystal display device for satisfying a recent demand of the low profile.

FIGS. 5 to 7 show an example of a side light type spread illuminating apparatus.

As shown in FIGS. 5 and 6, a spread illuminating apparatus 1 generally comprises a transparent substrate (a guide plate) 2 made of a light-transmissible material, a bar-like light source 3 disposed close to an end surface 2a of the transparent substrate 2, and a frame 4 on which the transparent substrate 2 and the light source 3 are mounted.

The light source 3 generally comprises a bar-like light conductive member (a guide rod) 5 made of a transparent material and disposed along and close to the end surface 2a of the transparent substrate 2, an LED 6 (a spot-like light source) disposed facing one end 5a of the light conductive member 5 and mounted on a flexible printed circuit board (hereinafter referred to as FPC) 8 together with the light conductive member 5, and a reflection plate 7 (to be discussed hereinbelow) disposed facing another end 5b of the light conductive member 5 and mounted on the FPC 8 together with the light conductive member.

The FPC 8 has a substantially elongate rectangular FPC main body 8a on which the light conductive member 5, the LED 6 and the reflection plate 7 are mounted. An extension having a connecter on a tip thereof is provided at the FPC main body 8a, though not shown in the figure.

The frame 4 comprises a substrate mounting section 10 shaped rectangular and adapted to mount the transparent substrate 2 on, and an FPC mounting section 11 shaped elongatedly rectangular, disposed in contact with the substrate mounting section 10 and adapted to receive the FPC main body 8a. The longitudinal dimension of the FPC mounting section 11 is set to be larger than the width of substrate mounting section 10.

A wall 12 is provided vertically at one end (the lower side in FIG. 6) of the substrate mounting section 10 as shown in FIG. 6. Further, a wall 13 is provided vertically at one end (an upper side in FIGS. 6 and 7) of the FPC mounting section 11 as shown in FIGS. 6 and 7.

Though not shown in the figures, the extension having a connector on the tip thereof is provided at a side of the FPC main body facing transparent substrate, and an opening through which the extension passes is formed at a flat area where the substrate mounting section and the FPC mounting section of the frame meet with each other.

In the above conventional art, the upper surface of the light conductive member 5 and the upper surface of the transparent substrate 2 are not flush with each other due to the thickness of the FPC 8. Thus, the coupling efficiency of light emitted from the light conductive member 5 and guided in the transparent substrate 2 (hereinafter referred to as "light coupling efficiency") is degraded.

SUMMARY OF THE INVENTION

The present invention has been made in the light of the above problem. Accordingly, it is an object of the present invention to provide a spread illuminating apparatus which can improve the light coupling efficiency between the light conductive member and the transparent substrate.

In order to solve the above problem, according to a first aspect of the present invention, in a spread illuminating apparatus comprising a transparent substrate which is made of a light-transmissible material, a bar-like light source which comprises a bar-like light source made of a transparent material and a spot-like light source disposed on at least one end of the light conductive member and mounted on an FPC together with the light conductive member and is disposed along and close to at least one end surface of the transparent substrate, and a frame on which the light conductive member and the spot-like light source both mounted on the FPC are mounted together with the transparent substrate, the frame is structured such that an FPC mounting section, on which an FPC main body shaped elongatedly rectangular and having the light conductive member and the spot-like light source arranged thereon is mounted, is lower by a predetermined dimension than a substrate mounting section, on which the transparent substrate is mounted.

In order to solve the above problem, according to a second aspect of the present invention, in the spread illuminating apparatus according to the first aspect of the present invention, the predetermined dimension is equal to a thickness of the FPC.

In order to solve the above problem, according to a third aspect of the present invention, in the spread illuminating apparatus according to the first or the second aspect of the present invention, an extension which has a connector on its tip is provided at a side of the FPC main body facing the transparent substrate, and an opening through which the extension passes is formed at a stepped part which constitutes a boundary between the substrate mounting section and the FPC mounting section in the frame.

DESCRIPTION OF THE PREFERRED EMBODIMENTS

Figure 5:
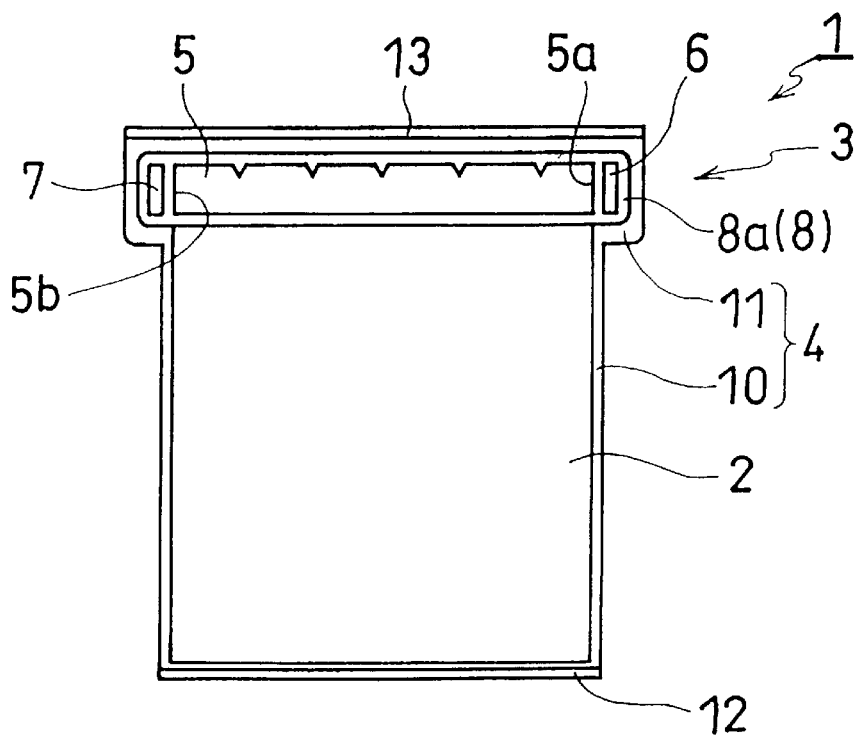
FIG. 5 is a plan view of an example of a conventional spread illuminating apparatus.
Figure 6:
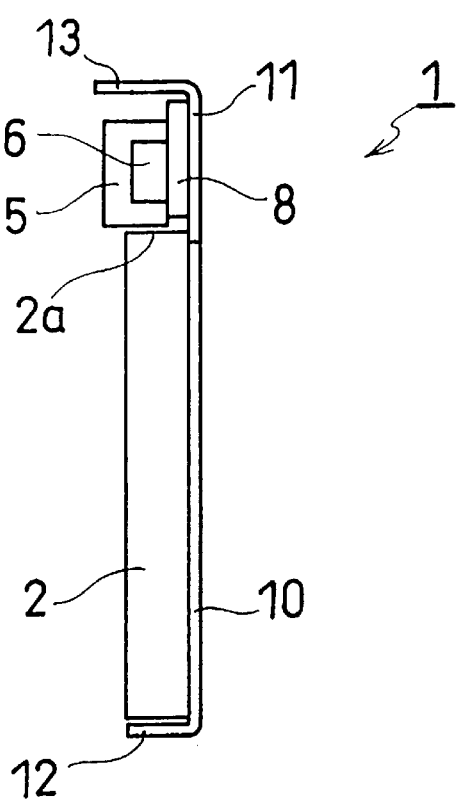
FIG. 6 is a front view of the conventional spread illuminating apparatus in FIG. 5.
Figure 7:
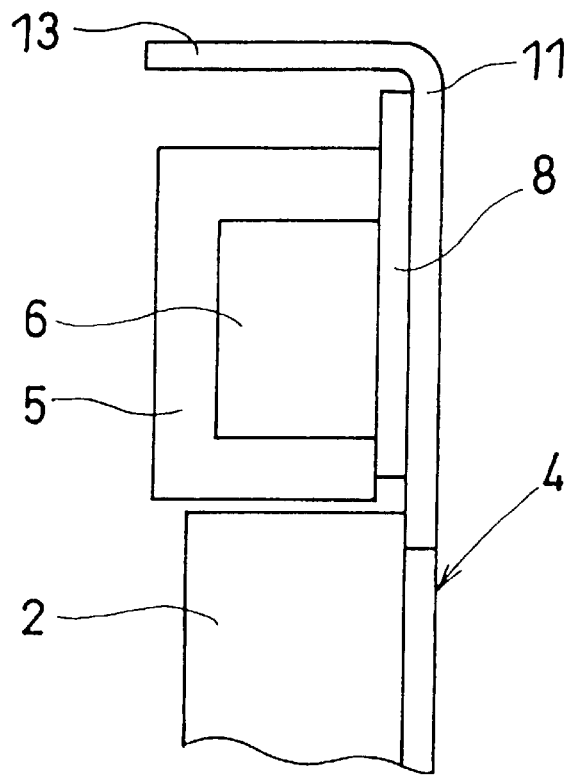
FIG. 7 is a an enlarged view of a part of the spread illuminating apparatus in FIG. 6.

A spread illuminating apparatus 1A according to a first embodiment of the present invention is hereinafter explained referring to FIGS. 1 to 4. The components identical with or corresponding to those shown in FIGS. 5 to 7 are represented by the same reference numerals, and detailed description thereof is omitted.

Figure 1:
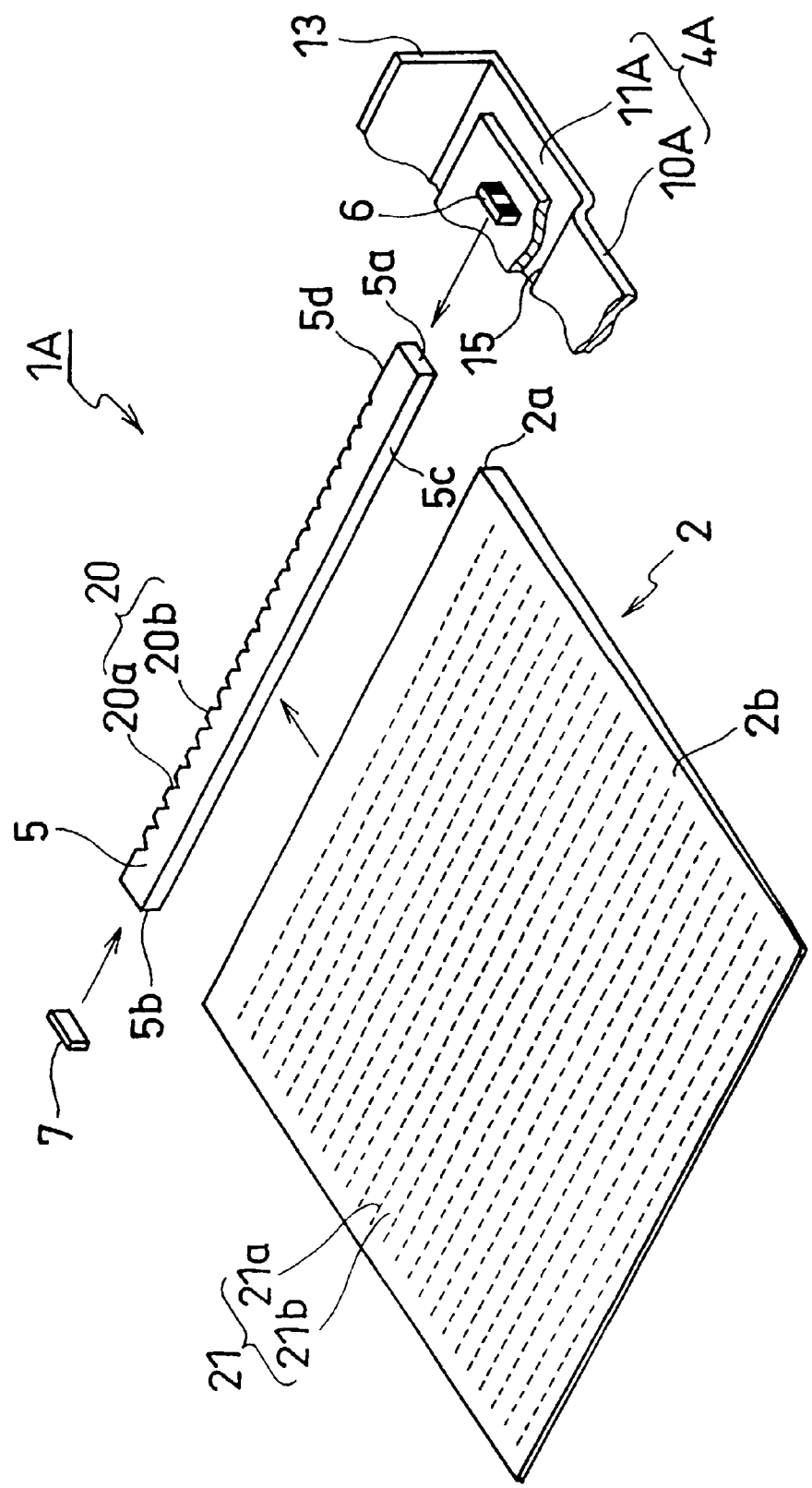
FIG. 1 is an exploded perspective view of a spread illuminating apparatus according to an embodiment of the present invention.
Figure 2:
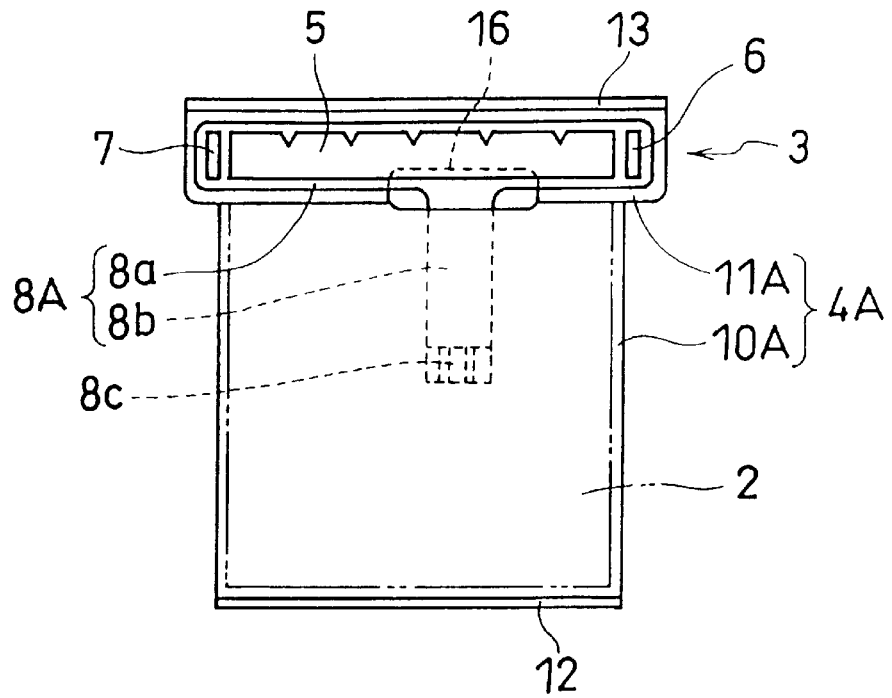
FIG. 2 is a plan view of the spread illuminating apparatus in FIG. 1.
Figure 3:
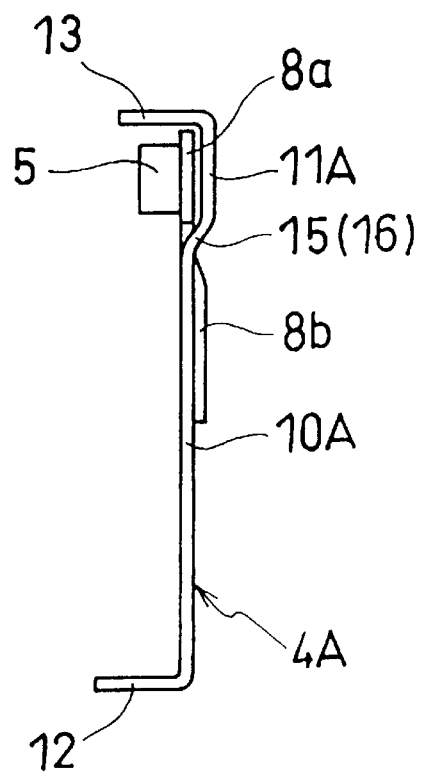
FIG. 3 is a front view of the spread illuminating apparatus in FIG. 1.

As shown in FIGS. 1 to 3, this spread illuminating apparatus 1A generally comprises a transparent substrate 2 made of a light-transmissible material, a bar-like light source 3 disposed close to an end surface 2a of the transparent substrate 2, and a frame 4A with the transparent substrate 2 and the light source 3 both mounted thereon.

This spread illuminating apparatus 1A is disposed with the transparent substrate 2 positioned under a liquid crystal panel of a liquid crystal display device (not shown in the figure) so as to auxiliarily illuminate the liquid crystal display device.

The light source 3 generally comprises a bar-like light conductive member (a guide rod) 5 made of a transparent material and disposed along and close to the end surface 2a of the transparent substrate 2, an LED 6 (spot-like light source) disposed facing one end 5a of the light conductive member 5 and mounted on a flexible printed circuit board (FPC) 8A together with the light conductive member 5, and a reflection plate 7 disposed facing another end 5b of the light conductive member 5 and mounted on the FPC 8A together with the light conductive member 5. The thickness 5 h of the light conductive member 5 is set equal to the thickness 2 h of the transparent substrate 2.

The FPC 8A comprises an FPC main body 8a shaped elongatedly rectangular and having the transparent substrate 2, the LED 6 and the reflection plate 7 all mounted thereon, and an extension 8b provided at a side of the FPC main body 8a toward the transparent substrate 2 (a lower side in FIG. 2) and having a connector 8c on its tip. The extension 8b is continuously connected to the FPC main body 8a via a bent part 8d as shown in FIG. 4 in order to ensure a predetermined dimension with respect to the FPC main body 8a.

Figure 4:
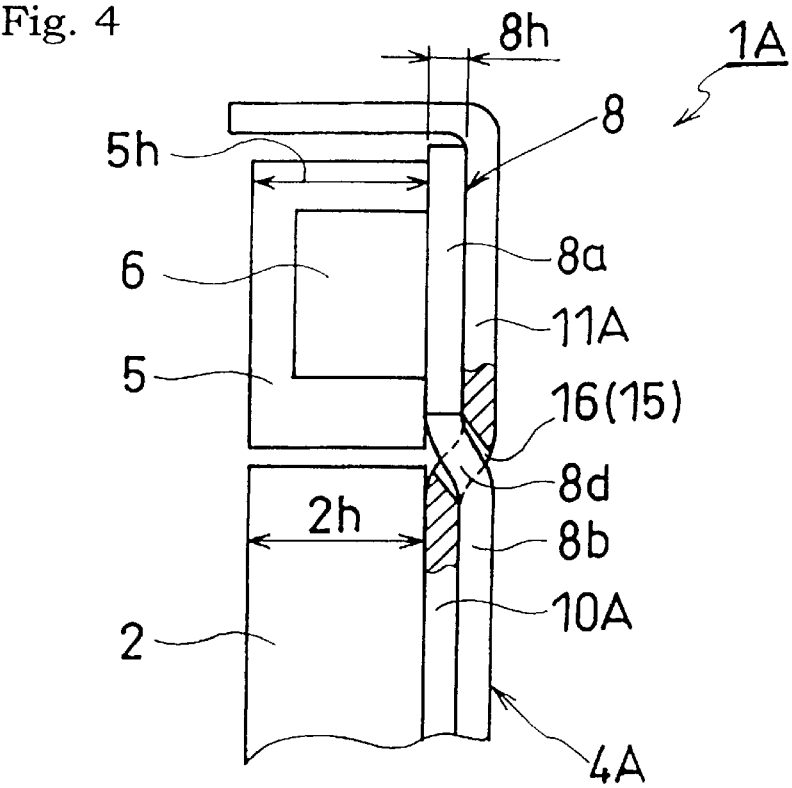
FIG. 4 is an enlarged sectional view of a part of the spread illuminating apparatus in FIG. 3.

As shown in FIGS. 2, 3 and 4, a frame 4A comprises a substrate mounting section 10A shaped rectangular and having the transparent substrate 2 mounted thereon, and an FPC mounting section 11A shaped elongatedly rectangular, continuous with the substrate mounting section 10A via a stepped part 15 and adapted to receive the FPC main body 8a. The longitudinal dimension of the FPC mounting section 11A is set to be larger than the width of the transparent substrate mounting section 10A. The FPC mounting section 11A is set to be lower than the transparent substrate mounting section 10A by the thickness 8 h of the FPC 8.

As shown in FIGS. 2 and 3, a wall 12 is provided vertically at an end (on the lower side in FIG. 3) of the substrate mounting section 10A. A wall 13 is provided vertically at an end (the upper side in FIG. 3) of the FPC mounting section 11A.

An opening 16 through which the extension 8b passes is formed at the stepped part 15 of the frame 4A. The extension 8b passes through the opening 16, the connector 8c provided on the tip of the extension 8b is disposed on a reverse side (the right side in FIG. 3) of the frame 4A and connected to an external circuit (not shown in the figure).

As shown in FIG. 1, an optical path conversion means 20 comprising grooves 20a substantially triangular in section and flat portions 20b formed therebetween is provided on a surface (a second surface of the light conductive member) 5d of the light conductive member 5 opposite to a surface (a first surface of the light conductive member) 5c facing the transparent substrate 2, whereby light introduced into the light conductive member 5 through the end 5a is uniformly spread over the first surface 5c of the light conductive member although the LED 6 is disposed only on the end 5a of the light conductive member 5.

A light reflection pattern 21 comprising grooves 21a and flat portions 21b is formed on one surface (the upper side in FIG. 1, hereinafter, referred to as "an upper surface") of the transparent substrate 2, and the brightness is substantially uniform everywhere at the transparent substrate 2 irrespective of the distance from the light conductive member 5.

In this spread illuminating apparatus 1A, the frame 4A is loaded such that the extension 8b passes through the opening 16, the FPC main body 8a having the light conductive member 5, the LED 6 and the reflection plate 7 all mounted thereon is disposed on the FPC mounting section 11A, and that the transparent substrate 2 is disposed on the substrate mounting section 10A, as shown in FIGS. 2 and 3.

As described above, in the present embodiment, the FPC mounting section 11A is set to be lower than the substrate mounting section 10A by the thickness 8 h of the FPC 8, and the thickness 5 h of the light conductive member 5 is set to be equal to the thickness 2 h of the transparent substrate 2. Thus, the upper surface (the left side in FIG. 4) of the light conductive member 5 mounted on the FPC mounting section 31A is adapted to be flush with the upper surface (the left side in FIG. 4) of the transparent substrate 2, and therefore since the light conductive member 5 is not set off the transparent substrate 2 in the thickness direction, the light coupling efficiency between the light conductive member 5 and the transparent substrate 2 can be improved.

In the conventional art, since the light conductive member 5 is set off the transparent substrate 2 in the thickness direction, the light coupling efficiency between the light conductive member 5 and the transparent substrate 2 is degraded. In the present embodiment, the light conductive member 5 and the transparent substrate 2 can be set without any deviation in the thickness direction from each other, and the conventional problem (degradation of the light coupling efficiency between the light conductive member 5 and the transparent substrate 2) can be eliminated.

The extension 8b provided at the FPC main body 8a is let through the opening 16 formed at the stepped part 15 of the frame, and thereby is disposed on the reverse side of the frame 4A. Thus, the provision of the extension 8b does not obstruct prevention of the deviation in the thickness direction between the light conductive member 5 and the transparent substrate 2.

According to the first aspect of the present invention, the frame is structured such that the FPC mounting section, on which the FPC main body shaped elongatedly rectangular and having the light conductive member and the spot-like light source arranged thereon is mounted, is lower by a predetermined dimension than the substrate mounting section, on which the transparent substrate is mounted. Accordingly, the upper surface of the light conductive member mounted on the FPC mounting section can be flush with the upper surface of the transparent substrate, and deviation in the thickness direction between the light conductive member and the transparent substrate can be avoided, whereby the light coupling efficiency between the light conductive member and the transparent substrate can be improved accordingly.

According to the second aspect of the present invention, the upper surface of the light conductive member mounted on the FPC mounting section is flush with the upper surface of the transparent substrate, and deviation in the thickness direction between the light conductive member and the transparent substrate can be avoided, whereby the light coupling efficiency between the light conductive member and the transparent substrate can surely be improved.

According to the third aspect of the present invention, the extension provided at the FPC main body of the FPC is let through the opening formed at the stepped part of the frame, and is disposed on the reverse side of the frame, whereby it can be avoided that the provision of the extension obstructs prevention of the deviation in the thickness direction between the light conductive member and the transparent substrate.

What is claimed is:

1. A spread illuminating apparatus, comprising:
    a frame;
    a transparent substrate made of a light-transmissible material and placed on the frame; and
    a bar-like light source comprising a bar-like light conductive member made of a transparent material, and a spot-like light source disposed on at least one end of the light conductive member, the bar-like light source disposed along and close to at least one end surface of the transparent substrate, and mounted on a flexible printed circuit board placed on the frame;
    wherein the frame comprises two sections, one section for receiving the flexible printed circuit board, and the other section for receiving the transparent substrate, the one section being lower by a predetermined dimension than the other section.

2. A spread illumination apparatus according to claim 1, wherein the predetermined dimension is equal to a thickness of the flexible printed circuit board.

3. A spread illuminating apparatus according to claim 1, wherein the flexible printed circuit board has a main body and an extension is provided on the flexible printed circuit board main body at a side facing the transparent substrate and has a connector on its tip, and an opening through which the extension passes is formed at a stepped part which constitutes a boundary between the substrate receiving section and the flexible printed circuit board receiving section in the frame.

4. A spread illuminating apparatus according to claim 2, wherein the flexible printed circuit board has a main body and an extension is provided on the flexible printed circuit board main body at a side facing the transparent substrate and has a connector on its tip, and an opening through which the extension passes is formed at a stepped part which constitutes a boundary between the substrate receiving section and the flexible printed circuit board receiving section in the frame.

* * * * *